(12) United States Patent
Kudo

(10) Patent No.: US 9,853,576 B2
(45) Date of Patent: Dec. 26, 2017

(54) CONTROL APPARATUS OF VIBRATION-TYPE ACTUATOR AND CONTROL METHOD OF VIBRATION-TYPE ACTUATOR

(71) Applicant: CANON KABUSHIKI KAISHA, Tokyo (JP)

(72) Inventor: Shinya Kudo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/222,387

(22) Filed: Jul. 28, 2016

(65) Prior Publication Data
US 2016/0336879 A1 Nov. 17, 2016

Related U.S. Application Data

(62) Division of application No. 14/203,393, filed on Mar. 10, 2014, now Pat. No. 9,479,087, which is a division
(Continued)

(30) Foreign Application Priority Data

Jun. 7, 2010 (JP) .................................. 2010-130156

(51) Int. Cl.
*H02K 33/00* (2006.01)
*H02N 2/06* (2006.01)
(Continued)

(52) U.S. Cl.
CPC ............... *H02N 2/06* (2013.01); *H02N 2/008* (2013.01); *H02N 2/0015* (2013.01);
(Continued)

(58) Field of Classification Search
CPC ........ H02N 2/06; H02N 2/0015; H02N 2/008; H02N 2/026; H02N 2/062; H02N 2/103; H02N 2/142
(Continued)

(56) References Cited

U.S. PATENT DOCUMENTS 5,173,631 A 12/1992 Suganuma
5,760,528 A 6/1998 Tomikawa
(Continued)

FOREIGN PATENT DOCUMENTS

CN 1501754 A 6/2004
CN 1534856 A 10/2004
(Continued)

OTHER PUBLICATIONS

European Office Action dated Jul. 22, 2013 in EP Application No. 11166666.5.
(Continued)

*Primary Examiner* — Rita Leykin
(74) *Attorney, Agent, or Firm* — Fitzpatrick, Cella, Harper & Scinto

(57) ABSTRACT

Provided is a control apparatus of a vibration-type actuator for generating an elliptical motion of contact portions by a common alternating current including a frequency determining unit for setting a frequency of the alternating current. The frequency determining unit sets the frequency of the alternating current for changing an ellipticity of the elliptical motion, within a frequency range such that ellipticity changing frequency ranges set for the vibrators are overlapped, and the ellipticity changing frequency ranges are set for the vibrators as frequency ranges between an upper limit and a lower limit, such that the lower limit is a maximum resonant frequency at a time of changing the ellipticity, and the upper
(Continued)

limit is larger than the lower limit and is a maximum frequency for the relative movement of the driving member.

19 Claims, 10 Drawing Sheets

Related U.S. Application Data of application No. 13/106,790, filed on May 12, 2011, now Pat. No. 8,669,723.

(51) Int. Cl.
*H02N 2/00* (2006.01)
*H02N 2/02* (2006.01)
*H02N 2/10* (2006.01)
*H02N 2/14* (2006.01)

(52) U.S. Cl.
CPC ............ *H02N 2/026* (2013.01); *H02N 2/062* (2013.01); *H02N 2/103* (2013.01); *H02N 2/142* (2013.01)

(58) Field of Classification Search
USPC ......................................................... 318/119
See application file for complete search history.

(56) References Cited

U.S. PATENT DOCUMENTS

| | | | |
|---|---|---|---|
| 5,821,667 A | 10/1998 | Takagi et al. | |
| 5,872,417 A | 2/1999 | Sugaya | |
| 6,078,438 A | 6/2000 | Shibata et al. | |
| 6,872,417 B1 | 3/2005 | Freudenrich et al. | |
| 6,879,085 B1 | 4/2005 | Shiv et al. | |
| 7,075,211 B1 * | 7/2006 | Ganor .................. | H02N 2/0075 310/317 |
| 7,109,639 B2 | 9/2006 | Yamamoto et al. | |
| 7,129,618 B2 | 10/2006 | Fujimoto et al. | |
| 7,173,362 B2 | 2/2007 | Magnussen et al. | |
| 7,183,690 B2 | 2/2007 | Shiv et al. | |
| 7,187,104 B2 | 3/2007 | Yamamoto et al. | |
| 7,211,928 B2 * | 5/2007 | Puskas .................. | B01J 19/10 310/316.01 |
| 7,211,929 B2 | 5/2007 | Ganor et a | |
| 7,336,019 B1 * | 2/2008 | Puskas .................. | A61L 2/02 310/317 |
| 7,342,347 B2 | 3/2008 | Magnussen et al. | |
| 7,449,814 B2 | 11/2008 | Kasai et al. | |
| 7,576,472 B2 | 8/2009 | Funakubo | |
| 7,578,187 B2 * | 8/2009 | Takahashi .......... | G01C 19/5663 73/504.12 |
| 7,646,136 B2 | 1/2010 | Adachi et al. | |
| 7,663,604 B2 | 2/2010 | Maruyama et al. | |
| 7,701,116 B2 | 4/2010 | Atsuta | |
| 7,737,604 B2 * | 6/2010 | Adachi .................. | H02N 2/028 310/316.01 |
| 7,741,753 B2 * | 6/2010 | Puskas .................. | B06B 1/0284 134/40 |
| 7,755,251 B2 * | 7/2010 | Kudo ..................... | H02N 2/062 310/316.01 |
| 7,830,103 B2 * | 11/2010 | Hashimoto ............ | H02N 2/004 310/316.01 |
| 7,830,183 B2 | 11/2010 | Seth et al. | |
| 8,035,275 B2 * | 10/2011 | Ashizawa ................ | G02B 7/08 310/323.01 |
| 8,075,695 B2 * | 12/2011 | Puskas .................... | B01J 19/10 134/1.3 |
| 9,252,686 B2 * | 2/2016 | Nitto ....................... | H02N 2/142 |
| 2006/0113867 A1 | 6/2006 | Sakatani et al. | |
| 2006/0175930 A1 | 8/2006 | Ganor et al. | |
| 2009/0066187 A1 | 3/2009 | Kudo | |
| 2009/0134745 A1 | 5/2009 | Ashizawa | |

FOREIGN PATENT DOCUMENTS

| | | |
|---|---|---|
| CN | 1534857 A | 10/2004 |
| CN | 101207342 A | 6/2008 |
| JP | 03-145976 A | 6/1991 |
| JP | 10-052072 A | 2/1998 |
| JP | 2004-320846 A | 11/2004 |
| JP | 2007-006596 A | 1/2007 |
| JP | 2009-089586 A | 4/2009 |
| JP | 2009-225503 A | 10/2009 |
| WO | 03/067746 A1 | 8/2003 |

OTHER PUBLICATIONS

Chinese Office Action dated Feb. 18, 2014 in Chinese Application No. 201110145592.2, with English-language translation.
Chinese Office Action dated Nov. 30, 2016 in Chinese Application No. 201510397231.5.

* cited by examiner

CONTROL APPARATUS OF VIBRATION-TYPE ACTUATOR AND CONTROL METHOD OF VIBRATION-TYPE ACTUATOR

This application is a division of U.S. patent application Ser. No. 14/203,393, filed on Mar. 10, 2014 (allowed), which is a division of U.S. patent application Ser. No. 13/106,790, filed on May 12, 2011 (now U.S. Pat. No. 8,669,723, issued on Mar. 11, 2014). The contents of each of the foregoing applications are incorporated herein by reference.

BACKGROUND OF THE INVENTION

Field of the Invention

The present invention relates to a control apparatus of a vibration-type actuator and a control method of a vibration-type actuator.

Description of the Related Art

Actuators are conventionally proposed which subject a given mass point on a plate-like vibrator to elliptical motion (driving member) to drive a driving member.

As a basic configuration of a vibration-type actuator with a plate-like vibrator, such a configuration as illustrated in Japanese Patent Application Laid-Open No. 2004-320846 is known. FIG. 8A is a perspective view illustrating an example of the external basic configuration of the vibration-type actuator in Japanese Patent Application Laid-Open No. 2004-320846.

As illustrated in FIG. 8A, a vibrator in the vibration-type actuator includes an elastic member 4 formed of a metal material shaped like a rectangular plate. The elastic member 4 includes a piezoelectric element (electromechanical energy transducer) 5 joined to a back surface thereof. A plurality of protrusions 6 are provided on a top surface of the elastic member 4 at respective predetermined positions.

According to this configuration, applying an AC voltage to the piezoelectric element 5 allows simultaneous generation of secondary bending vibration in a long side direction of the elastic member 4 and primary bending vibration in a short side direction of the elastic member 4. This excites elliptical motion in the protrusions 6.

Then, the driving member 7 is brought into contact with the top portions (contact portions) of the protrusions 6 under pressure and then linearly driven by elliptical motion of the protrusions 6. That is, the protrusions 6 act as a drive unit for the vibrator.

FIG. 8B is a schematic diagram illustrating an example of a polarization area of the piezoelectric element 5 in the vibration-type actuator illustrated in FIG. 8A.

Furthermore, FIGS. 9A and 9B are perspective views illustrating a vibration mode of the elastic unit 4. FIG. 9C is a diagram illustrating elliptical motion excited in the protrusions 6 of the elastic unit 4.

The piezoelectric element 5 is subjected to a polarization process and includes two electrodes A1 and A2, as illustrated in FIG. 8B.

AC voltages V1 and V2 in phase with each other are applied to the two electrodes A1 and A2, respectively, to excite the rectangular elastic unit 4 into primary bending movement with two nodes extending in a direction parallel to the long side direction. This corresponds to a first vibration mode illustrated in FIG. 9A.

Furthermore, the AC voltages V1 and V2 out of phase with each other are applied to the two electrodes A1 and A2, respectively, to excite the rectangular elastic unit 4 into secondary bending movement with three nodes extending in a direction parallel to the short side direction. This corresponds to a second vibration mode illustrated in FIG. 9B.

Then, the first vibration mode and the second vibration mode are combined together to excite elliptical motion in the protrusions 6. At this time, when brought into contact with the protrusions 6 under pressure, the driving member can be linearly driven.

Here, the first vibration mode illustrated in FIG. 9A allows activation of an amplitude (hereinafter referred to as a Z-axis amplitude) displaced in a direction perpendicular to the surface of the contact portion (hereinafter referred to as the contact surface brought into contact with the driving member under pressure in the protrusions 6.

Furthermore, the second vibration mode illustrated in FIG. 9B allows an amplitude (hereinafter an X-axis amplitude) displaced in a direction parallel to the contact surface to be excited in the protrusions 6.

Combination of the first vibration mode and the second vibration mode allows elliptical motion to be excited in a predetermined one of the protrusions 6 as illustrated in FIG. 9C. The ratio in magnitude between the Z-axis amplitude and the X-axis amplitude is hereinafter referred to as ellipticity of elliptical motion.

FIG. 10A is a graph illustrating the amplitudes in the first vibration mode and the second vibration mode observed when the difference in phase between the two-phase voltages V1 and V2 is changed between −180 degrees and 180 degrees.

When the difference in phase between the two-phase AC voltages V1 and V2 applied to the respective two electrodes A1 and A2 of the polarized piezoelectric element 5 is changed between −180 degrees and 180 degrees, the amplitudes in the first vibration mode and the second vibration mode (P2) are as illustrated by P1 and P2 in FIG. 10A, respectively.

In FIG. 10A, the axis of abscissas indicates the phase difference. The axis of ordinate indicates the amplitudes in the first amplitude mode and in the second amplitude mode.

Combination of the first vibration mode and the second vibration mode allows elliptical motion to be excited in the protrusions 6. Changing the phase difference between the AC voltages V1 and V2 to be applied allows adjustment of ellipticity of elliptical motion excited in the predetermined protrusion 6.

FIG. 10A illustrates, in the lower part thereof, elliptical shapes corresponding to the phase differences on the axis of abscissas. The direction of driving by the vibration-type actuator, which provides linear driving, can be switched by switching between the positive sign and negative sign of the phase difference between the AC voltages V1 and V2.

Moreover, the direction and speed of driving can be consecutively changed by consecutively changing the phase difference starting with any value, with the sign appropriately changed between the positive one and the negative one (for example, consecutively changing the phase difference between 90 degrees and −90 degrees, with the sign appropriately changed between the positive one and the negative one).

Concerning the driving speed, the following phenomenon (which is called a cliff drop phenomenon) occurs as illustrated in FIG. 10B. The driving speed peaks at the resonant frequency and decreases slowly on a higher frequency side of the resonant frequency, while decreasing rapidly on a lower frequency side of the resonant frequency.

Furthermore, as is generally known, the speed can be increased by setting the frequency of the AC voltage applied to the piezoelectric element closer to the resonant frequency.

The speed can be reduced by setting the frequency of the applied AC voltage further away from the resonant frequency.

As such a vibration-type actuator, an apparatus can be provided which exerts a driving force increased using a plurality of vibrators.

However, when the vibration-type actuator is configured to drive the driving member, using a plurality of vibrators, the following problem may occur.

When a common frequency is applied to each of the plurality of vibrators in order to simplify the circuit configuration of a control apparatus of the vibration-type actuator, the vibration-type actuator operates unstably if the resonant frequency varies among the vibrators. Thus, the vibration-type actuator needs to drive the object without using frequency regions corresponding to the unstable operation.

In view of the above-described problem, an object of the present invention is to provide a control apparatus of a vibration-type actuator and a control method of a vibration-type actuator in which the vibration-type actuator configured to drive the driving member using a plurality of vibrators can drive the object stably even with a variation in resonant frequency among the vibrators.

SUMMARY OF THE INVENTION

The present invention provides a control apparatus and method for a vibration-type actuator described as follow.

A control apparatus for a vibration-type actuator, wherein the vibration-type actuator includes a plurality vibrators each having a contact portion contacting an object to be driven, such that, responsive to a common alternating current signal to the plurality vibrators, the plurality vibrators move, through the contact portions, the object relative to the vibrators, to generate an elliptical motion of the object, wherein the control apparatus comprises a frequency determining unit for setting a frequency of the alternating current signal, and the frequency determining unit sets the frequency of the alternating current signal for changing an ellipticity of the elliptical motion, within an overlapping frequency range in which frequency ranges of ellipticity changing each set for each of the plurality of vibrators are overlapped, and the frequency ranges of changing the ellipticity are set for the vibrators as a frequency ranges between an upper limit and a lower limit, such that the lower limit is a maximum resonant frequency in all case of changing the ellipticity, and the upper limit is larger than the lower limit and is a maximum frequency for the relative movement of the driving member.

A control method for a vibration-type actuator, wherein the vibration-type actuator includes a plurality vibrators each having a contact portion contacting an object to be driven, such that, responsive to a common alternating current signal to the plurality vibrators, the plurality vibrators move, through the contact portions, the object relative to the vibrators, to generate an elliptical motion of the object, wherein the control method comprises a step for setting a frequency of the alternating current signal, and, in the step frequency determining, the frequency of the alternating current signal is set for changing an ellipticity of the elliptical motion, within an overlapping frequency range in which frequency ranges of ellipticity changing each set for each of the plurality of vibrators are overlapped, and the frequency ranges of changing the ellipticity are set for the vibrators as a frequency ranges between an upper limit and a lower limit, such that the lower limit is a maximum resonant frequency in all case of changing the ellipticity, and the upper limit is larger than the lower limit and is a maximum frequency for the relative movement of the driving member.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Exemplary Embodiment

The configuration of a control apparatus of a vibration-type actuator according to a first exemplary embodiment of the present invention will be described with reference to FIG. 1.

The vibration-type actuator according to the present exemplary embodiment includes a plurality of vibrators each at least with an electromechanical energy transducer and an elastic member.

An alternating current of a drive frequency common to the electromagnetic energy transducers in the respective plurality of vibrators is applied to the electromagnetic energy transducers to drive a driving member which is in contact with the plurality of vibrators via contact portions thereof.

Figure 1:
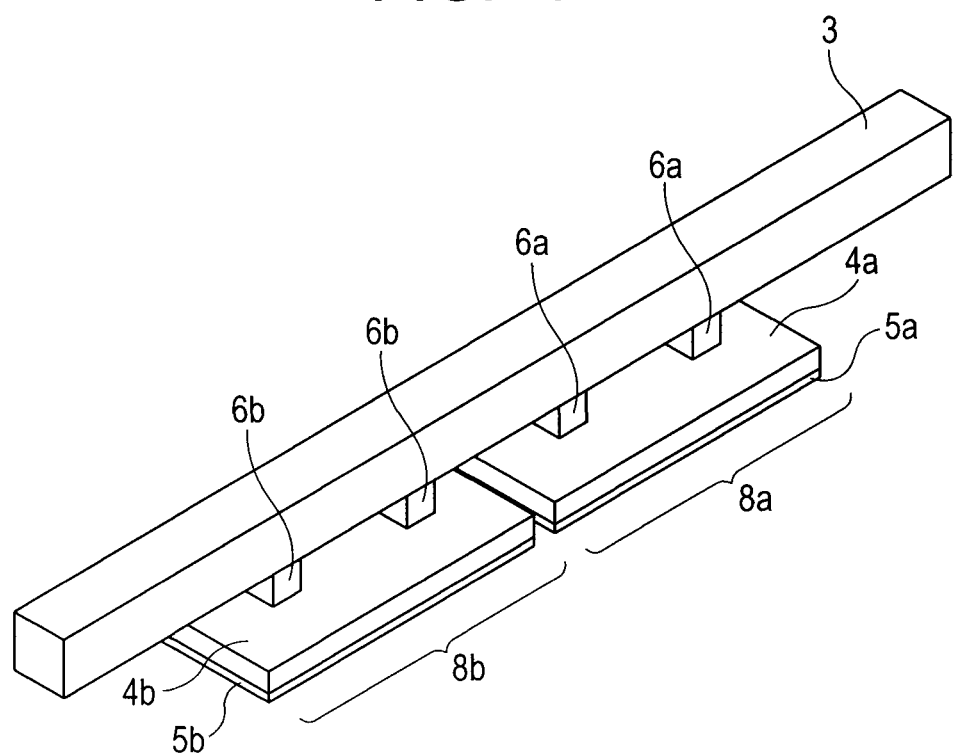
FIG. 1 is a perspective view illustrating the external configuration of a vibration-type actuator according to a first exemplary embodiment of the present invention.

FIG. 1 illustrates a vibration-type actuator including two vibrators configured to relatively drive one driving member. The vibration-type actuator is configured to cause relative movement of a linearly extending driving member in a longitudinal direction thereof. The two vibrators can generate a double thrust.

Vibrators 8a and 8b illustrated in FIG. 1 move integrally owing to a holder (not shown in the drawings), relative to a driving member 3.

As illustrated in FIG. 1, the vibrator 8a of the vibration-type actuator includes an elastic member 4a formed of a metal material shaped like a rectangular plate. A piezoelectric element (electromechanical energy transducer) 5a is joined to a back surface of the elastic member 4a.

Two protrusions 6a are provided on a top surface of the elastic member 4a at respective predetermined positions.

The vibrator illustrated in FIG. 1 subjects the protrusions to elliptical motion so as to drive the driving member which is in frictional contact with upper portions (contact portions) of the protrusions. Similarly, in the vibrator 8b, a piezoelectric element 5b is joined to an elastic member 4b. Two protrusions 6b are provided at respective predetermined positions on the elastic member 4b.

Figure 8A:
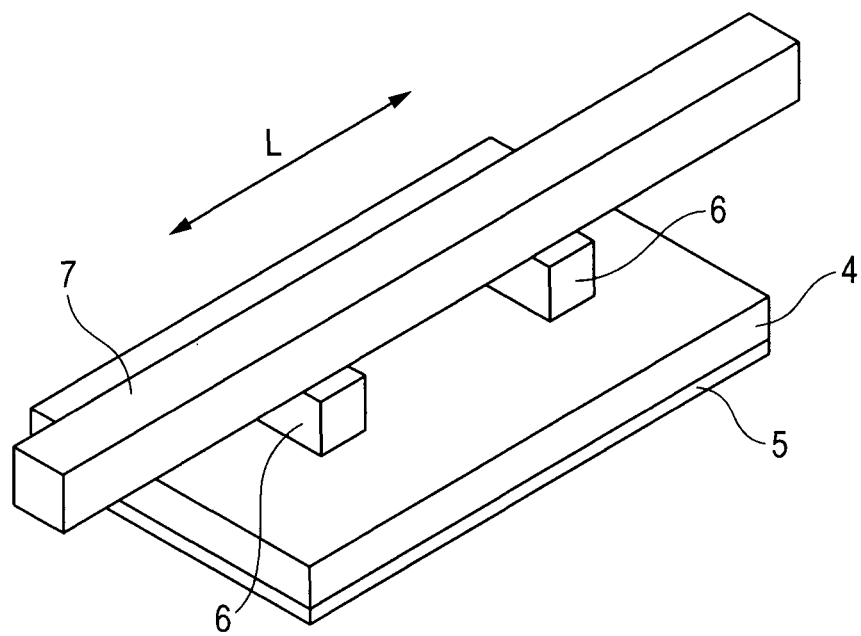
FIG. 8A is a perspective view illustrating an example of an external basic configuration of a vibration-type actuator in a conventional example.
Figure 8B:
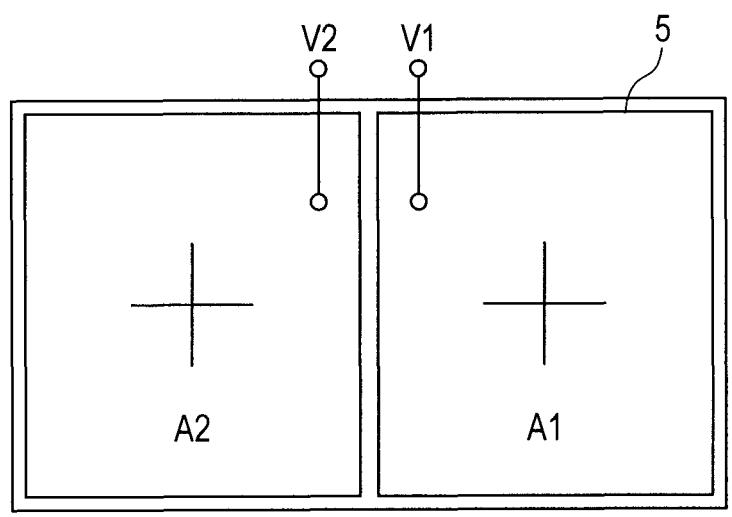
FIG. 8B is a schematic diagram illustrating an example of a polarization area of a piezoelectric element in the vibration-type actuator illustrated in FIG. 8A.
Figure 9A:
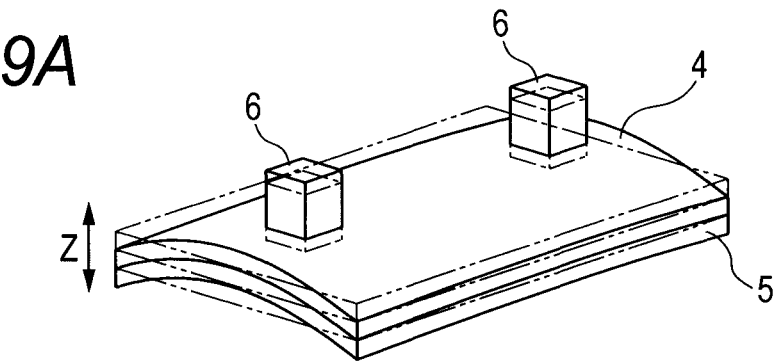
FIGS. 9A and 9B are perspective views illustrating a vibration mode of an elastic member of the vibration-type actuator in the conventional example.
Figure 9B:
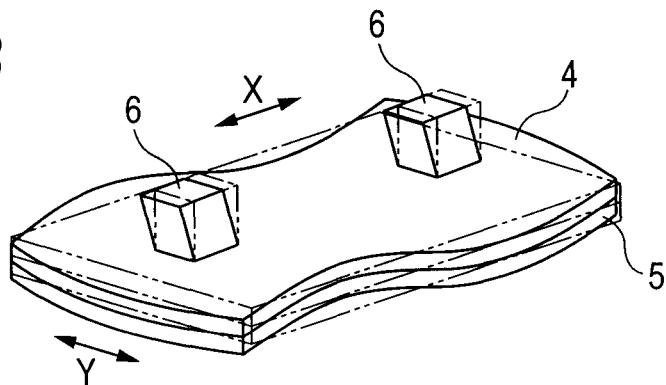
Figure 9C:
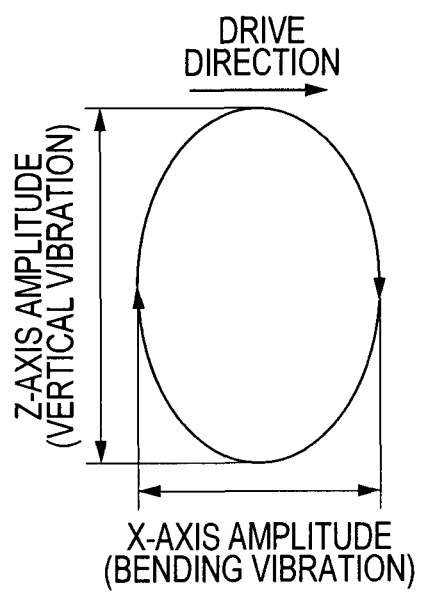
FIG. 9C is a diagram illustrating elliptical motion excited in protrusions of the elastic member.

Each of the piezoelectric elements 5a and 5b includes two groups of electrodes A1 and A2 illustrated in FIG. 8B. Each of the piezoelectric elements 5a and 5b is subjected to a polarization process in the direction of the sheet of FIG. 8B.

In the vibrator configured as described above, the ellipticity of elliptical motion excited in the protrusions 6a and 6b illustrated in FIG. 1 can be changed by changing the phase difference between two-phase AC voltages (two-phase alternating current) to be applied.

Figure 10A:
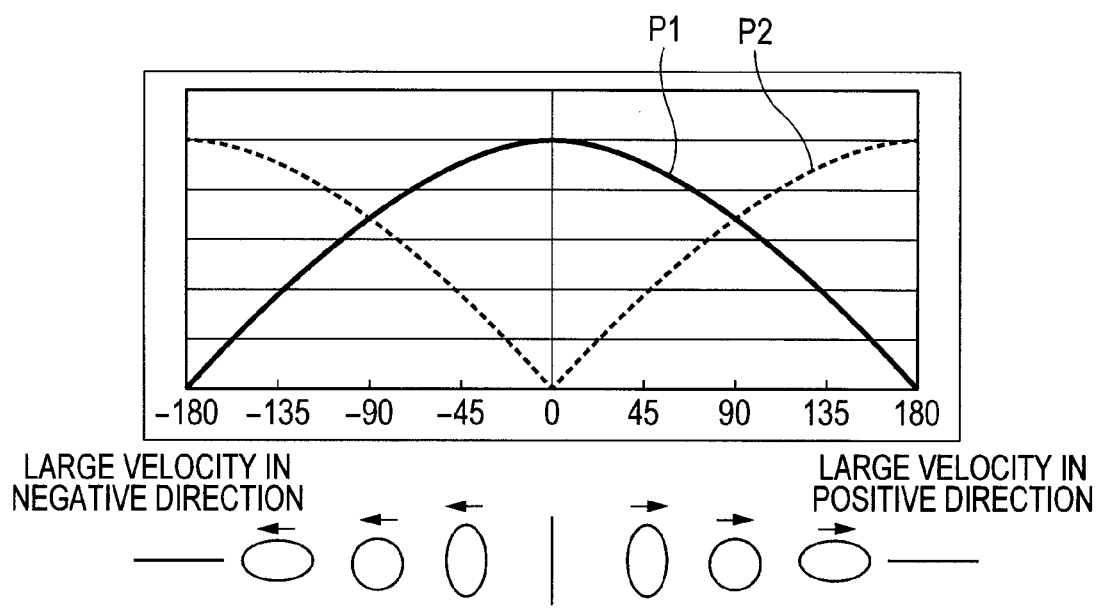
FIG. 10A is a graph illustrating amplitudes in a first vibration mode and a second vibration mode.
Figure 10B:
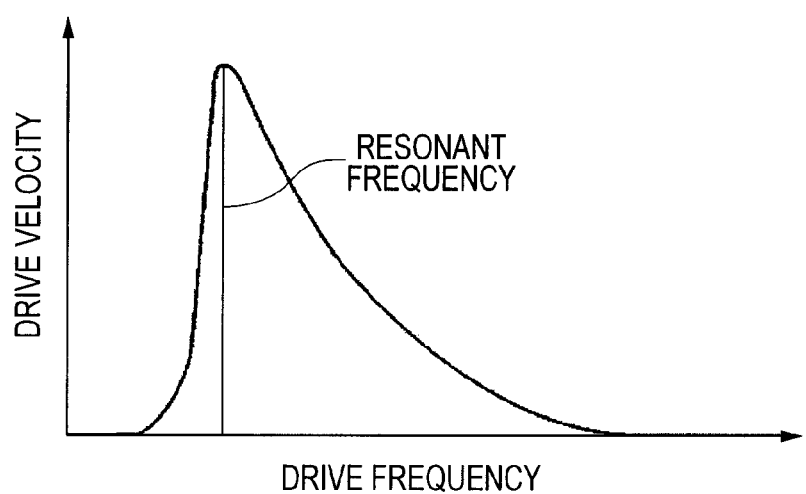
FIG. 10B is a graph illustrating the relationship between the frequency and speed of the vibrator.

The vibrator illustrated in FIG. 1 can be increased in speed by making the drive frequency of the AC voltage applied to the piezoelectric element of the vibrator closer to a resonant frequency as illustrated in FIG. 10B.

Furthermore, the speed of the vibrator can be reduced by making the frequency of the AC voltage applied to the piezoelectric element of the vibrator further away from the resonant frequency.

Additionally, the vibrator is characterized in that the driving speed peaks at the resonant frequency and gradually decreases on a higher frequency side of the resonant frequency, while decreasing rapidly on a lower frequency side of the resonant frequency.

Furthermore, the movement speed of the driving member can be increased by increasing an X-axis amplitude of elliptical motion excited in the protrusions 6a and 6b.

In addition, the movement speed of the driving member can be stably reduced by decreasing the X-axis amplitude, with a Z-axis amplitude maintained at a predetermined value.

Additionally, the direction of relative movement of the driving member can be switched by switching the phase difference between the two-phase AC voltages.

The present exemplary embodiment enables adjustment of ellipticity of elliptical motion excited in the predetermined protrusions 6a and 6b when the phase difference between the AC voltages applied to electrodes V1 and V2 of the piezoelectric element 5 illustrated in FIG. 8B described above is changed between −180 degrees and 180 degrees.

FIG. 10A illustrates, in the lower part thereof, elliptical shapes corresponding to the phase difference on the axis of abscissas.

The driving direction and speed can be consecutively changed by consecutively changing the phase difference between 90 degrees and −90 degrees with the sign appropriately changed between a positive one and a negative one.

The above-described configuration excites vibration in each of the vibrators 8a and 8b in FIG. 1 to enable driving of the driving member (slider) 3.

Furthermore, the vibrator according to the present invention is not limited to the above-described exemplary embodiment. The vibrator may subject the protrusions to elliptical motion based on a combination of vibration in the vibration mode in which the Z-axis amplitude is excited in the protrusions and vibration in the vibration mode in which the X-axis amplitude is excited in the protrusions. Specifically, besides the above-described embodiment, an embodiment is possible in which the protrusions are subjected to elliptical motion based on a combination of longitudinal stretching vibration of the vibrator and bending vibration thereof.

Now, the driving characteristics of one vibrator illustrated in FIG. 1 will be described.

Figure 2:
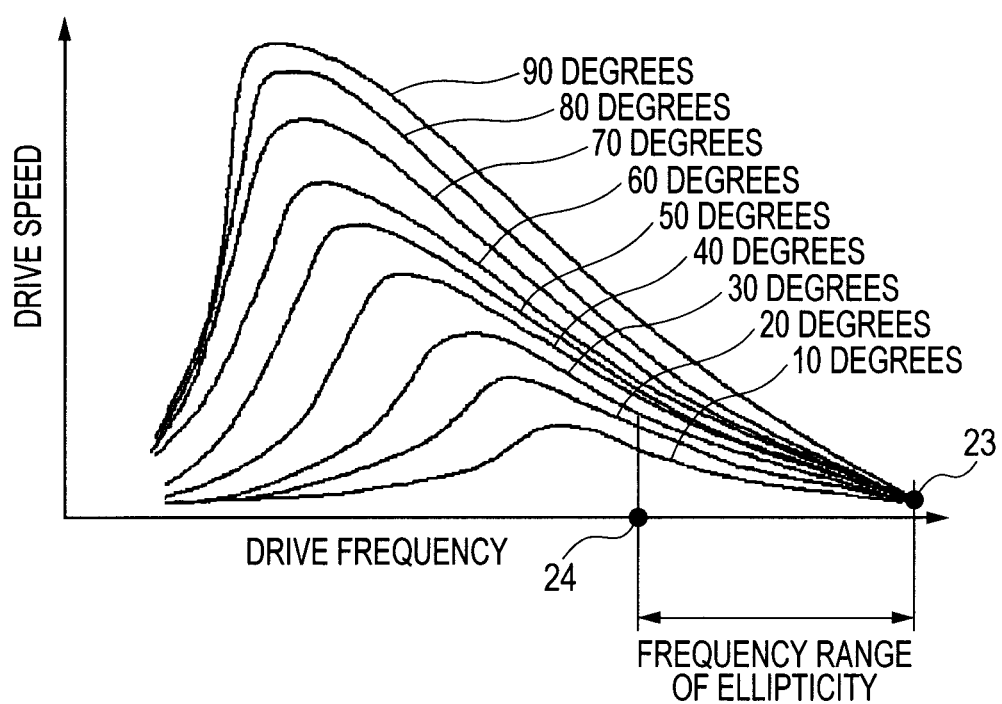
FIG. 2 is a graph illustrating the relationship between the drive frequency and driving speed of a vibrator in the vibration-type actuator.

FIG. 2 is a graph illustrating the relationship between the phase difference and drive frequency and driving speed of the AC voltages applied to the electrode A1 and the electrode A2 (see FIG. 8B) when one vibrator drives one driving member. For example, as illustrated in FIG. 2, as the phase difference starts at 90 degrees and approaches 0 degree, the amplitude in the second amplitude mode decreases to reduce the driving speed. Furthermore, as the phase difference starts at 90 degrees and approaches 0 degree, the resonant frequency increases.

Here, the driving characteristics obtained with the phase difference changed will be described.

For example, if the drive frequency is set to the value of the resonant frequency corresponding to a phase difference of 60 degrees, and the phase difference is shifted from 90 degrees toward a smaller phase difference side, then the cliff drop phenomenon is avoided while the phase difference is between 90 degrees and 60 degrees, because the drive frequency is higher than the resonant frequency. However, when the phase difference is shifted toward values smaller than 60 degrees, the cliff drop phenomenon occurs abruptly. That is, when the drive frequency is set to the value of the resonant frequency obtained when the phase difference is 60 degrees, and the phase difference is changed, the operation is unstable when the phase difference is smaller than 60 degrees.

However, if the drive frequency is set to the value of the resonant frequency corresponding to a phase difference of 10 degrees, and the phase difference is shifted from 90 degrees toward a smaller phase difference side, then the cliff drop phenomenon is avoided while the phase difference is between 90 degrees and 10 degrees, because the drive frequency is higher than the resonant frequency corresponding to the phase difference of 10 degrees.

That is, if the vibrator is driven with the drive frequency fixed and with the phase difference changed, the likelihood of the cliff drop phenomenon can be reduced by driving the vibrator with the phase difference set to correspond to a frequency higher than the resonant frequency corresponding to a smaller phase difference.

A resonant frequency 24 corresponding to a phase difference of 0 degree as described above is highest, and is thus defined as a lower limit value for control with the phase difference changed.

Now, the driving characteristics obtained with the frequency changed will be described.

For example, when the drive frequency is swept up toward frequencies higher than the resonant frequency with the phase difference set to 90 degrees, the driving speed decreases gradually. Then, the driving speed lowers abruptly and the driving member stops operation at a portion 23 of the drive frequency range. Thus, a frequency higher than the lower limit value and at which the driving member stops relative movement is defined as an upper limit value for phase difference control. Furthermore, the upper limit value may be, instead of the portion 23 at which the driving member stops operation during the above-described sweep-up process, a frequency corresponding to a portion at which the speed rises rapidly when the drive frequency is swept down from a value sufficiently higher than the resonant frequency. That is, according to the present invention, the upper limit value may be set equal to a frequency higher than the lower limit value and at which the driving member stops relative movement.

The range of frequencies between the upper limit value and the lower limit value described above is set to be an ellipticity changing frequency range. Changing the ellipticity within the ellipticity changing frequency range allows avoidance, during driving, of the cliff drop phenomenon and the portion at which the driving member stops operation as a result of a rapid decrease in driving speed.

Figure 3:
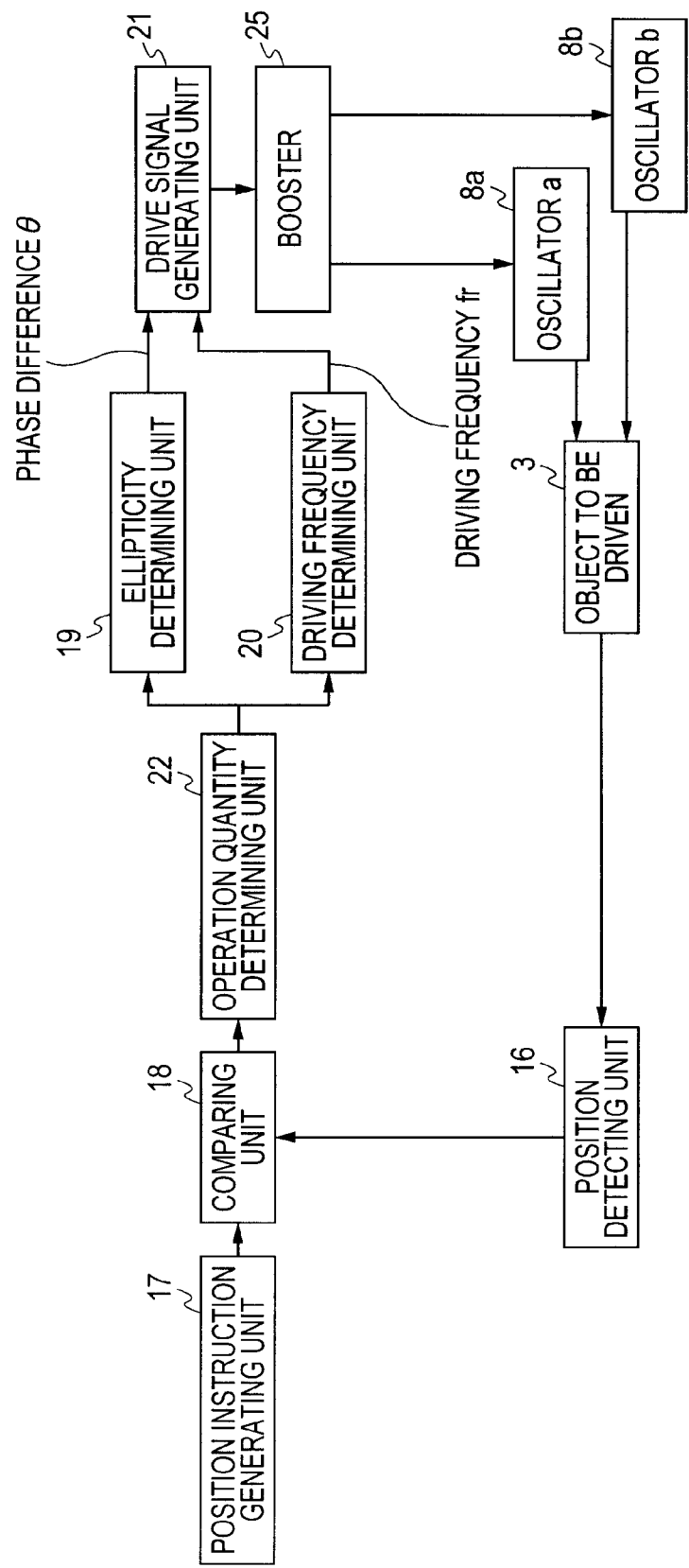
FIG. 3 is a block diagram illustrating the configuration of a control apparatus of the vibration-type actuator according to the first exemplary embodiment of the present invention.

The configuration of the control apparatus of the vibration-type actuator according to the present exemplary embodiment will be described with reference to a block diagram in FIG. 3.

The control apparatus includes a position instruction generating unit 17 configured to generate a target value for the driving member and to which an operation quantity determining unit 22 is connected via a comparing unit 18 on the output side thereof.

The comparing unit 18 compares the target value output by the position instruction generating unit 17 with the current position of the driving member which is output by a position detecting unit 16.

The operation quantity determining unit 22 calculates the quantity e of operation of the vibration-type actuator based on the comparison result from the comparing unit 18.

The operation quantity determining unit 22 includes a PI controller or a PID controller. The position detecting unit 16 detects the position of the driving member 3, and includes, for example, a linear scale or an encoder.

The vibrator 8a is configured as illustrated in FIG. 1 described above. The vibrator 8a includes the elastic member 4a formed of a metal material shaped like a rectangular plate, the piezoelectric element 5a joined to the back surface of the elastic member 4a, and the plurality of protrusions 6a provided on the front surface of the elastic member 4a.

Similarly, the vibrator 8b is configured as illustrated in FIG. 1 described above. The vibrator 8b includes the elastic member 4b formed of a metal material shaped like a rectangular plate, the piezoelectric element 5b joined to the back surface of the elastic member 4b, and the plurality of protrusions 6b provided on the front surface of the elastic member 4b as a driving portion.

The driving member 3 is illustrated in FIG. 1 and connected to the output side of the vibrators 8a and 8b.

An ellipticity determining unit 19 and a frequency determining unit 20 are connected to the output side of the operation quantity determining unit 22; the ellipticity determining unit 19 sets a ratio for an ellipse in the above-described elliptical motion, and the frequency determining unit 20 sets the frequency of an alternating current.

The ellipticity determining unit 19 is configured to be able to set the ratio of the X-axis amplitude and Z-axis amplitude in the elliptical motion caused in the protrusions of the vibrators 8a and 8b based on an output from the operation quantity determining unit 22. The ellipticity determining unit 19 is further configured to be able to set a phase difference allowing the ratio to be achieved.

The drive frequency determining unit 20 is configured to be able to set the driving frequencies of AC voltages to be applied to the vibrators 8a and 8b based on the output from the operation quantity determining unit 22.

Moreover, output sides of the ellipticity determining unit 19 and drive frequency determining unit 20 are connected to a drive signal generating unit 21.

The drive signal generating unit 21 generates a two-phase alternating current with the frequencies determined by the frequency determining unit 20 and the phase difference determined by the ellipticity determining unit 19.

A booster 25 is connected to an output side of the drive signal generating unit 21. The booster 25 boosts the two-phase alternating current generated by the drive signal generating unit 21, and applies the boosted two-phase alternating current to the piezoelectric elements of the vibrators 8a and 8b.

The booster 25 may be formed of a power amplifier, a switching element, a DC/DC circuit, or a transformer circuit.

The functions of the ellipticity determining unit 19 and drive frequency determining unit 20 according to the present embodiment will be described with reference to FIG. 4.

Figure 4:
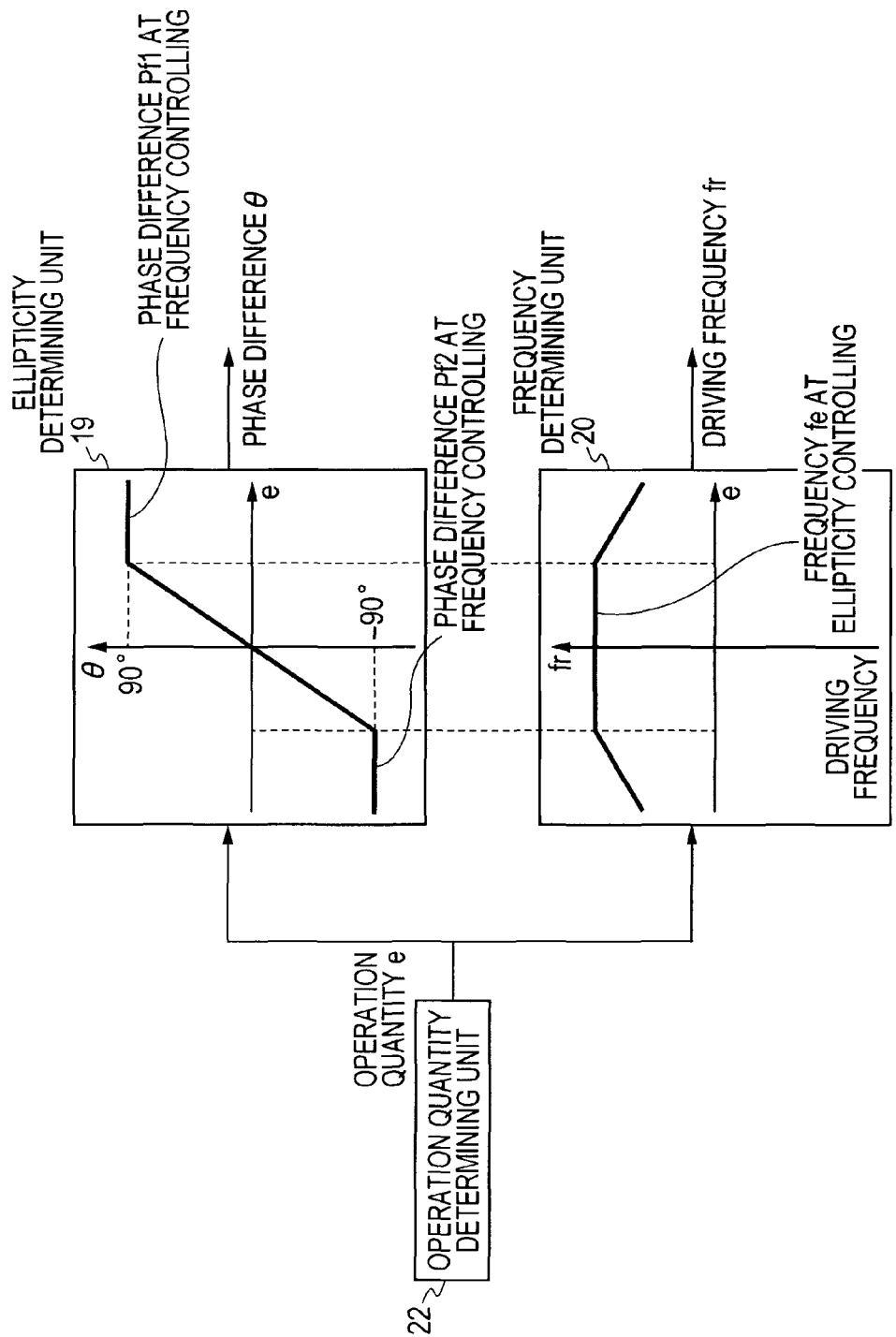
FIG. 4 is a block diagram illustrating an ellipticity determining unit and a frequency determining unit in the vibration-type actuator in detail according to the first exemplary embodiment of the present invention.

In each graph in FIG. 4, the axis of abscissas indicates the operation quantity e. The axis of ordinate indicates one of a phase difference θ and a drive frequency fr.

The value of the operation quantity e output by the operation quantity determining unit 22 is input to the ellipticity determining unit 19.

The ellipticity determining unit 19 uses this input value to determine the ellipticity based on settings expressed in the graphs.

The operation quantity e output by the operation quantity determining unit 22 is also input to the drive frequency determining unit 20. The drive frequency determining unit 20 then determines the drive frequency fr based on the settings expressed in the graphs.

As illustrated in the graphs in FIG. 4, when the operation quantity e has a small absolute value, the phase difference determined by the ellipticity determining unit changes. When the operation quantity e has a large absolute value, the frequency determined by the frequency determining unit 20 changes.

Thus, areas with the frequency and the phase difference constant therein are provided so as to prevent the phase difference from changing when the frequency changes, while preventing the frequency from changing when the phase difference changes. The frequency fixed when the phase difference changes are hereinafter referred to as an ellipticity controlling frequency (fe).

Now, the ellipticity controlling frequency (fe) set when a plurality of vibrators with different resonant frequencies drive the driving member using a common drive frequency will be described; this aspect is most important in the present invention.

Figure 5:
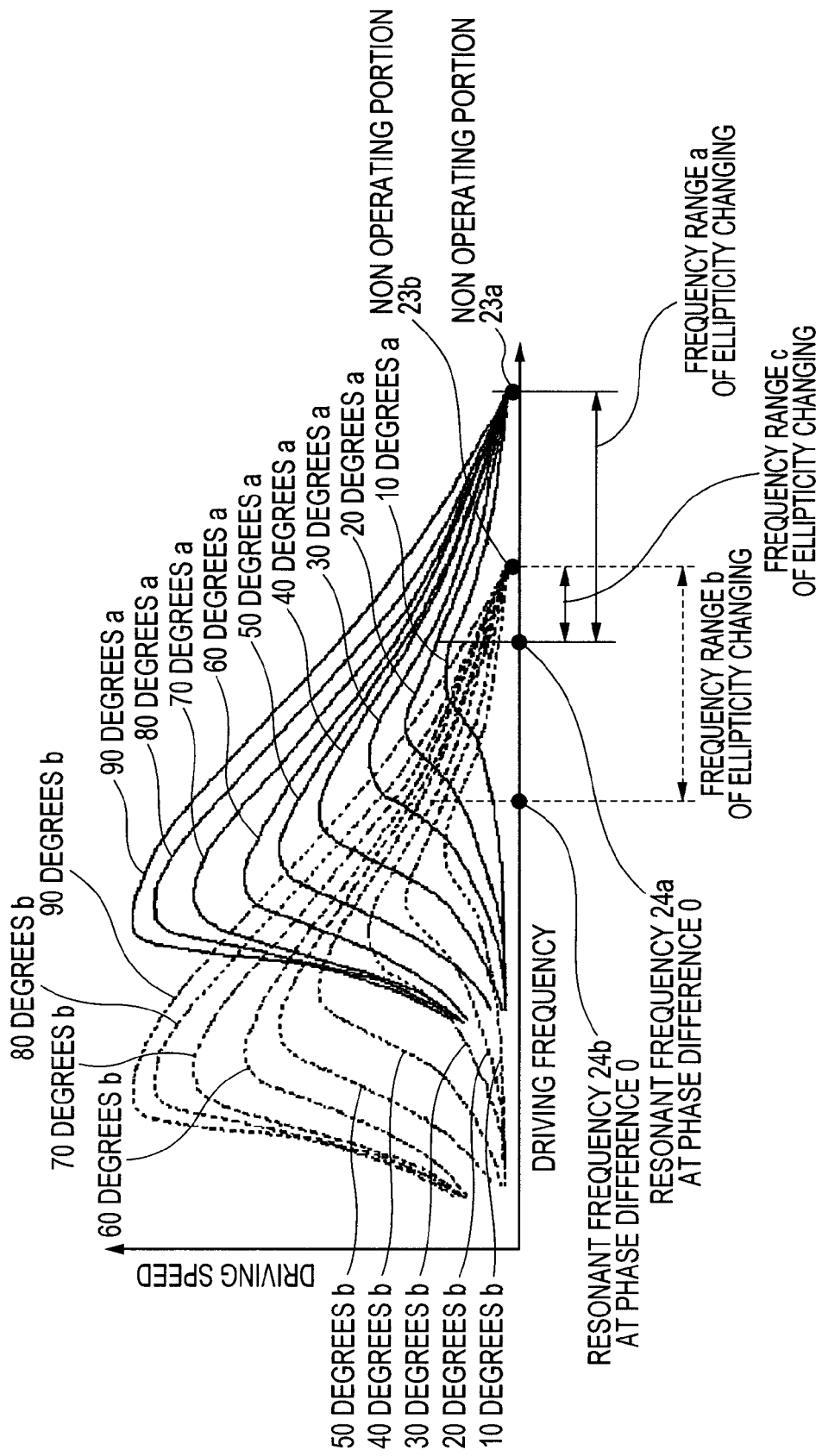
FIG. 5 is a graph illustrating the relationship between the drive frequency and driving speed of the vibrator in the vibration-type actuator according to the first exemplary embodiment of the present invention.

FIG. 5 illustrates the relationship between the drive frequency and the phase difference and the driving speed observed when one of the two vibrators with different resonant frequencies drives one driving member.

FIG. 5 is a graph illustrating the driving speed observed when the phase difference between the two-phase voltages V1 and V2 applied to the piezoelectric element illustrated in FIG. 8B is changed.

The drive frequency vs. driving speed observed when the phase difference for the vibrator 8a is changed between 90 degrees and 10 degrees is as illustrated at 90 degrees (a) to 10 degrees (a) in FIG. 5.

The resonant frequency corresponding to a phase difference of 0 degree for the vibrator 8a is a resonant frequency 24a corresponding to a phase difference of 0 degree illustrated in FIG. 5. Similarly, the drive frequency vs. driving speed observed when the phase difference for the vibrator 8b is changed between 90 degrees and 10 degrees is as illustrated at 90 degrees (b) to 10 degrees (b) in FIG. 5. The resonant frequency corresponding to a phase difference of 0 degree for the vibrator 8b is a resonant frequency 24b corresponding to a phase difference of 0 degree illustrated in FIG. 5. Furthermore, when the vibrator 8a places the driving member in relative movement, the maximum frequency at which the driving member stops relative movement is illustrated at 23a. When the vibrator 8b places the driving member in relative movement, the maximum frequency at which the driving member stops relative movement is illustrated at 23b.

In the present embodiment, the ellipticity changing frequency range (a), the range of driving frequencies set by the frequency determining unit based on the characteristics of the respective plurality of vibrators, is determined as follows.

That is, as described above, the lower limit value of the ellipticity changing frequency range is defined as the resonant frequency corresponding to the phase difference of 0 degree (the lower limit value is defined as the maximum resonant frequency obtained when the ellipticity determining unit changes the ellipticity).

Furthermore, the upper limit value is defined as the maximum frequency at which the driving member can be driven when the driving member is driven at a frequency higher than the lower limit value.

The ellipticity changing frequency range (a) lies between the thus determined lower limit value and upper limit value.

Similarly, the ellipticity changing frequency range (b) is determined based on the characteristics of the vibrator 8b. In the following description, the vibrators 8a and 8b drive one driving member.

For example, when the vibrators 8a and 8b drive one driving member, the cliff drop phenomenon does not occur even if the phase difference for the vibrator 8b is changed at the resonant frequency of the vibrator 8a corresponding to a phase difference of 30 degrees.

However, the cliff drop phenomenon occurs when the phase difference for the vibrator 8a is changed from 90 degrees toward a smaller phase difference side.

Then, the driving speed of the vibrator 8a decreases rapidly, thus suppressing the driving speed of the vibrator 8b.

Furthermore, the driving speed becomes unstable. To avoid this state during driving is the object of the present invention as described above.

That is, when the driving member is driven at a frequency lower than the ellipticity changing frequency range (c), the cliff drop phenomenon may occur in any of the plurality of vibrators which has a higher resonant frequency.

On the contrary, when the driving member is driven at a frequency higher than the ellipticity changing frequency range (c), the driving speed of any of the plurality of vibrators which has a lower resonant frequency may decrease and pass beyond the portion of the frequency range at which the vibrator stops operation.

In contrast, according to the present embodiment, the ellipticity determining unit is configured to be able to change (control) the ellipticity within the overlapping range of driving frequencies between the ellipticity changing frequency ranges set by the frequency determining unit based on the characteristics of the respective plurality of vibrators.

Specifically, the ellipticity controlling frequency (fe) illustrated in FIG. 4 is set equal to the ellipticity changing frequency range (c), which is the overlapping portion between the ellipticity changing frequency ranges of the two vibrators.

Thus, the driving speed can be prevented from being unstable during driving when one driving member is placed in relative driving and when a common frequency is applied to a plurality of vibrators.

Second Exemplary Embodiment

A second exemplary embodiment will be described which corresponds to an example of a configuration for setting the upper limit of the ellipticity changing frequency, the highest frequency of a frequency range used for driving by a vibration-type actuator, and the lower limit of the ellipticity changing frequency, the lowest frequency of the frequency range.

The present embodiment provides a control method of a vibration-type actuator in which a plurality of vibrators drives one driving member. In this method, a characteristics detector detects the characteristics of each of the plurality of vibrators.

Then, the following are set based on the results of detection of the characteristics of each vibrator: the upper limit value of the ellipticity changing frequency, the highest frequency of the frequency range used by the plurality of vibrators to drive one driving member, and the lower limit value of the ellipticity changing frequency, the lowest frequency of the frequency range.

A control apparatus of the vibration-type actuator in which a plurality of vibrators drive one driving member has a configuration similar to that in the first exemplary embodiment. Thus, description of the configuration is omitted.

Figure 6:
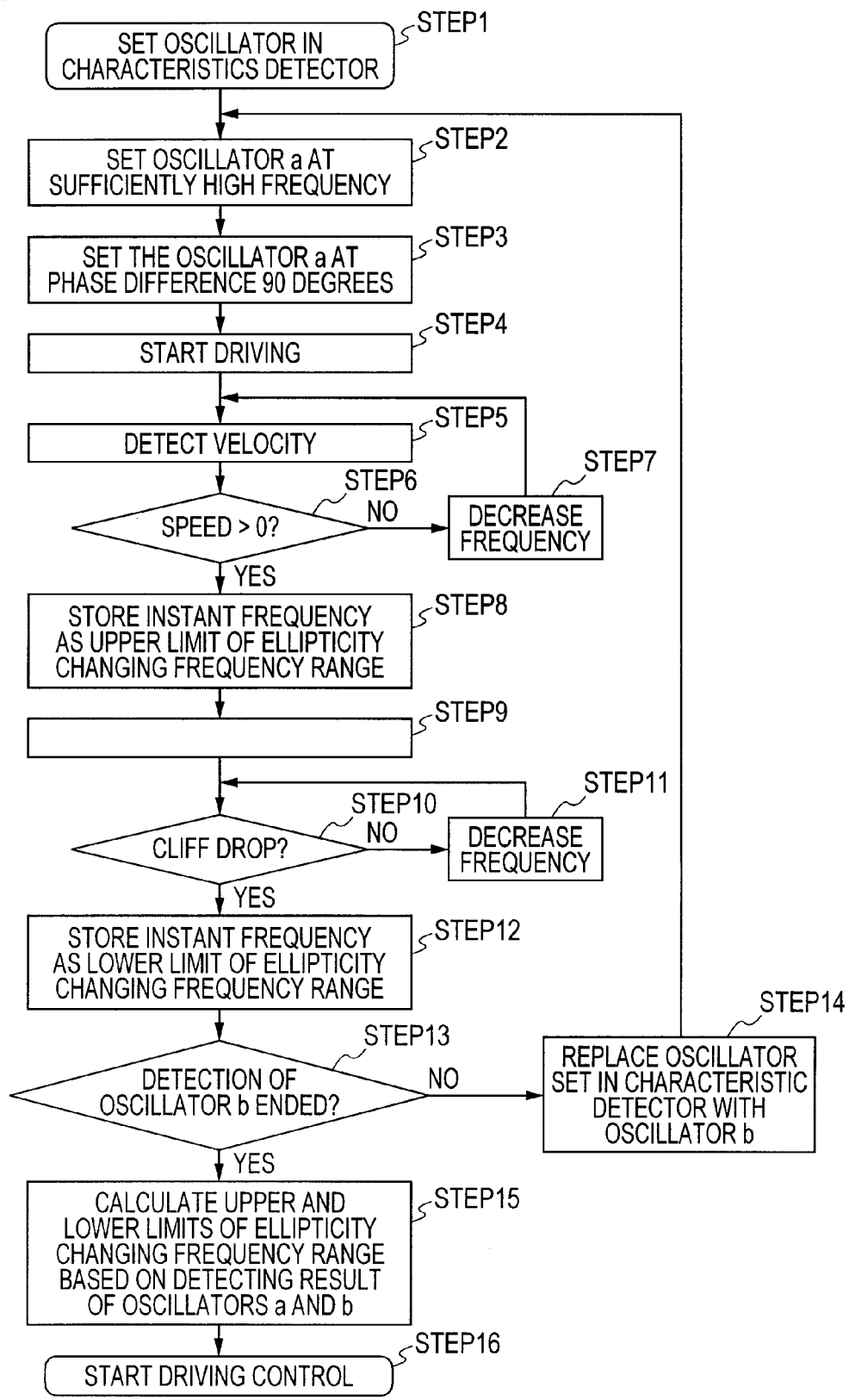
FIG. 6 is a flowchart for a vibration-type actuator according to a second exemplary embodiment of the present invention.

Now, detection of the output characteristics of each vibrator according to the present embodiment will be specifically described with reference to a flowchart in FIG. 6.

First, in STEP 1, the vibrator 8a of the vibration-type actuator, in which the vibrators 8a and 8b illustrated in FIG. 1 drive one driving member 3, is set in a characteristics detector (not shown in the drawings).

The characteristics detector (not shown in the drawings) is an apparatus including a sensor configured to detect the driving characteristics of an vibrator in an actuator including the one vibrator and one driving member as illustrated in FIG. 8A.

Then, in STEP 2, the frequency to be applied to the vibrator 8a is set to a sufficiently large value.

Then, in STEP 3, the phase difference for the vibrator 8a is set to 90 degrees.

When the phase difference is changed, the driving speed of the vibration-type actuator is maximized at the set phase difference.

Then, in STEP 4, the frequency and phase difference set in STEP 2 and STEP 3 are applied to the vibrator 8a to start driving.

Then, in STEP 5, the speed is detected. The speed detected in this case is that of the relative driving between the vibrator 8a and the driving member.

Then, in STEP 6, comparison is carried out to determine whether the speed detected in STEP 5 is equal to or larger than 0. If the detected speed is higher than 0, the process proceeds to STEP 8.

Furthermore, if the speed detected in STEP 5 is zero, the detector determines that the driving member and the vibrator fail to make relative movement. The process proceeds to STEP 7.

Then, in STEP 7, the frequency is reduced. The process then proceeds to STEP 5.

Here, if the driving member and the vibrator fail to make relative movement, the operation between STEP 5 and STEP 7 is repeated.

Then, in STEP 8, the frequency being applied to the vibrator 8a is stored in a memory (not shown in the drawings) as the upper limit value of the ellipticity changing frequency.

Then, in STEP 9, the phase difference applied to the vibrator is set to 1 degree.

This is to detect the resonant frequency at as small a phase difference as possible because the resonant frequency of the vibrator increases when the phase difference is shifted from 90 degrees toward a smaller phase difference side.

Here, the phase difference is set to a sufficiently small value, 1 degree.

In subsequent STEP 10, the detector detects whether or not the cliff drop phenomenon is occurring, in which the driving speed decreases rapidly. If the cliff drop phenomenon is not occurring, the process proceeds to STEP 11. If the cliff drop phenomenon is occurring, the process proceeds to STEP 12.

In STEP 11, the frequency is reduced. If the cliff drop phenomenon is not detected, the operation in STEP 10 and STEP 11 is repeated.

In STEP 12, the frequency being applied to the vibrator 8a is stored in the memory (not shown in the drawings) as the lower limit value of the ellipticity changing frequency.

Then, in STEP 13, the vibrator set in the characteristics detector is changed from the vibrator (a) to the vibrator (b). Thereafter, the process proceeds to STEP 2 to repeat the above-described operation. The operation allows the output characteristics of the vibrator 8b to be detected after detection of the output characteristics of the vibrator 8a.

In the method carried out between STEP 1 and STEP 14, the output characteristics of the vibrator 8a are detected and then the output characteristics of the vibrator 8b are detected. This allows the output characteristics of each of the vibrators to be detected as illustrated in FIG. 5.

Then, in STEP 15, an ellipticity changing frequency range is determined which lies between the upper limit value and lower limit value detected in STEP 1 to STEP 14 when the vibrator 8a is set in the characteristics detector. Furthermore, an ellipticity changing frequency range is determined which lies between the upper limit value and lower limit value detected when the vibrator 8b is set in the characteristics detector. Then, the overlapping range (common range) between the two ellipticity changing frequency ranges is calculated.

This enables calculation of the overlapping ellipticity changing frequency range (c) between the ellipticity changing frequency ranges (a) and (b) of the respective vibrators illustrated in the first exemplary embodiment.

Then, in STEP 16, the vibrators 8a and 8b can be incorporated into the vibration-type actuator in which two vibrators relatively drive one driving member. The vibration-type actuator can then carry out controllable driving as in the case of the first exemplary embodiment based on the value calculated in STEP 15.

In the present embodiment, when a plurality of vibrators relatively drive one driving member, and a common frequency is applied to the plurality of vibrators, each of the vibrators is mounted in the output characteristics detector, which thus detects the ellipticity changing frequency range.

Thus, the ellipticity changing frequency range (c) can be set based on the overlapping portion between the detected ellipticity changing frequency ranges.

Hence, when a plurality of vibrators relatively drive one driving member, pre-detection of the ellipticity changing frequency range of each of the vibrators allows easy setting of the ellipticity changing frequency range required when the plurality of vibrators relatively drive the one driving member.

Third Exemplary Embodiment

Figure 7:
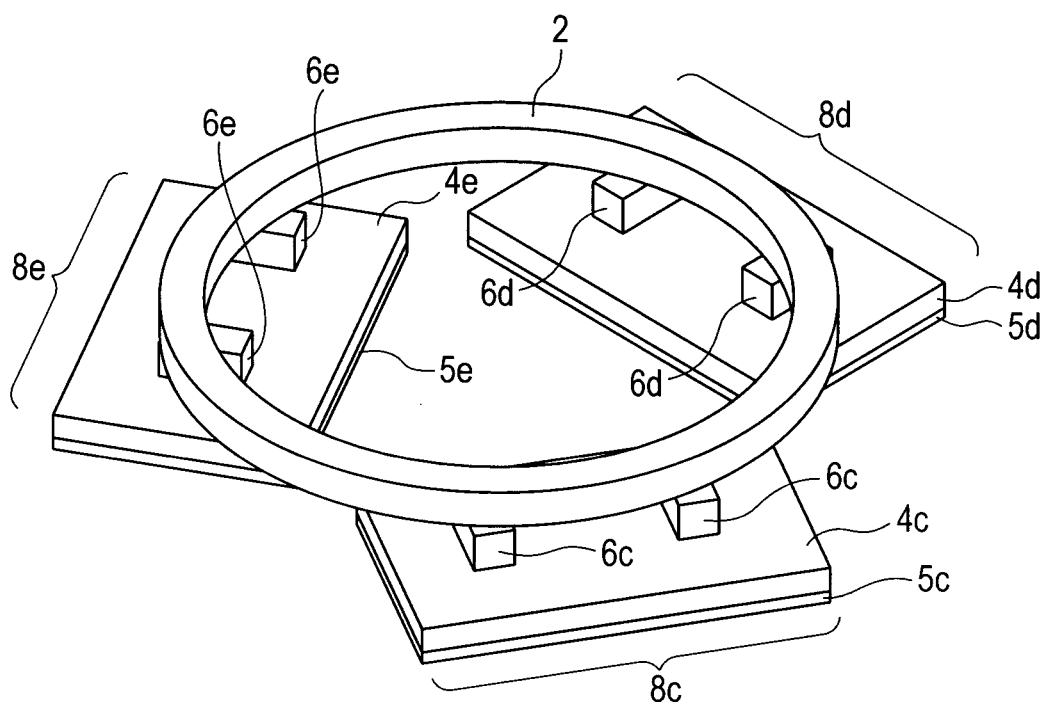
FIG. 7 is a diagram illustrating the configuration of a vibration-type actuator according to a third exemplary embodiment of the present invention.

With reference to FIG. 7, a third exemplary embodiment will be described which corresponds to an example of a configuration in which three vibrators rotationally drive a ring-shaped driving member.

In the first and second exemplary embodiments, the vibration-type actuator in which two vibrators relatively drive one driving member has been described by way of example.

In the present exemplary embodiment, as illustrated in FIG. 7, three vibrators can rotationally drive a ring-shaped driving member.

The ring-shaped driving member can perform no operations other than the one of being rotated by a guide (not shown in the drawings). In this configuration, when the vibrators drive the driving member within the overlapping portion between the ellipticity changing frequency ranges of the respective vibrators, the driving can be achieved with the driving speed prevented from being unstable.

In the present embodiment, vibrators 8c, 8d, and 8e relatively drive one driving member 2, and a common frequency is applied to the vibrators 8c, 8d, and 8e, as illustrated in FIG. 7. When the vibrators drive the driving member within the overlapping ellipticity changing frequency range between the ellipticity changing frequency ranges of the respective vibrators 8c, 8d, and 8e, the driving is achieved with the driving speed prevented from being unstable.

Furthermore, the upper limit value of the ellipticity changing frequency range corresponding to the highest frequency and the lower limit value of the ellipticity changing frequency range corresponding to the lowest frequency can be set in a manner similar to that in the second exemplary embodiment.

Specifically, the characteristics of the respective vibrators are detected by different characteristics detectors.

Then, based on results for the characteristics of each of the vibrators, the upper limit value of the ellipticity changing frequency range corresponding to the highest frequency and the lower limit value of the ellipticity changing frequency range are set for the frequency range used for driving by the vibration-type actuator in which the vibrators 8c, 8d, and 8e drive the one driving member 2.

Thus, when a plurality of vibrators relatively drive one driving member, pre-detection of the ellipticity changing frequency range of each of the vibrators allows easy setting of the ellipticity changing frequency range required when the plurality of vibrators relatively drive the one driving member.

As described above, the configuration according to each embodiment of the present invention allows stable driving to be achieved when a plurality of vibrators drives one driving member and when a common frequency is applied to the plurality of vibrators.

That is, even with a variation in resonant frequency between the vibrators, stable driving can be achieved in the overlapping portion between the ellipticity changing frequency ranges of the respective vibrators.

Furthermore, stable driving can be achieved by adjusting the ellipticity changing frequency range based on the output characteristics of each vibrator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-130156, filed Jun. 7, 2010, which is hereby incorporated by reference herein in its entirety.

What is claimed is:

1. An apparatus comprising:
   a first vibrator;
   a second vibrator; and
   a frequency determining unit configured to set frequency of two alternating voltages commonly applied to the first vibrator and the second vibrator in a range between a first frequency and a second frequency in a case of controlling the driving by changing phase difference of the two alternating voltages,
   wherein the first vibrator has a first resonant frequency when two alternating voltages with a phase difference are applied to the first vibrator,
   wherein the second vibrator has a second resonant frequency when two alternating voltages with the phase difference are applied to the second vibrator, the second resonant frequency being higher than the first resonant frequency,
   wherein the first frequency is a resonant frequency of the second vibrator when two alternating voltages with a phase difference of 0 degree are applied to the second vibrator, and
   wherein the second frequency is a frequency at which a relative position of the first vibrator and a part of an object begins to change.

2. The apparatus according to claim 1, wherein the object is to be in contact with the first vibrator and the second vibrator.

3. The apparatus according to claim 1, wherein an elliptical motion is generated at a contact portion of the first vibrator and a contact portion of the second vibrator by an application of the two alternating voltages.

4. The apparatus according to claim 1, wherein an ellipticity determining unit is provided to change a phase difference between phases of the two alternating voltages.

5. The apparatus according to claim 1, comprising
   an operating quantity determining unit configured to calculate an operating quantity of the first vibrator and an operating quantity of the second vibrator.

6. The apparatus according to claim 1, comprising:
   a position instruction generating unit configured to generate a target value of the object,
   a position detecting unit configured to detect a position of the object, and
   a comparing unit configured to compare the target value outputted from the position instruction generating unit with an output from the position detecting unit.

7. The apparatus according to claim 1,
   wherein the first vibrator and the second vibrator each comprise an elastic member having a plate-like shape and protrusion protruding from a top surface of the elastic member.

8. The apparatus according to claim 1,
   wherein the first vibrator and the second vibrator are arranged to be in contact with the object, and
   wherein the relative position of the first vibrator and the part of an object changes in a longitudinal direction of the first vibrator.

9. The apparatus according to claim 1,
   wherein the relative position of the first vibrator and the part of an object changes linearly.

10. The apparatus according to claim 1,
    wherein the object has a ring-like shape, and
    wherein the first vibrator and the second vibrator are arranged in a ring so that the first vibrator and the second vibrator are to be in contact with the object.

11. An apparatus comprising:
    a vibration-type actuator having a plurality of vibrators; and
    a control apparatus of the vibration-type actuator, configured to apply a common alternating voltages to the plurality of vibrators to generate an elliptical motion of contact portions of the plurality of vibrators, the elliptical motion changing relative positions of a part of an object contacting the contact portion and the plurality of vibrators,
    wherein the control apparatus comprises a frequency determining unit configured to set a frequency of the alternating voltages in a range between a first frequency and a second frequency in case of controlling the vibration-type actuator by changing ellipticity of the elliptical motion,
    wherein the first frequency is a maximum resonant frequency among resonant frequencies of the plurality of vibrators in a case of changing the ellipticity of the elliptical motion of the plurality of vibrators, and
    wherein the second frequency is a maximum frequency for changing the relative positions of the part of the object and the plurality of vibrators, higher than the first frequency.

12. The apparatus according to claim 11, wherein
    the alternating voltages include two alternating voltages, and
    an ellipticity determining unit is provided to change a phase difference between two phases of the two alternating voltages, to change the ellipticity of the elliptical motion.

13. The apparatus according to claim 11, comprising
    an operating quantity determining unit configured to calculate an operating quantity of the vibration-type actuator.

14. The apparatus according to claim 11, comprising
    a position instruction generating unit configured to generate a target value of the object,
    a position detecting unit configured to detect a position of the object, and
    a comparing unit configured to compare the target value outputted from the position instruction generating unit with an output from the position detecting unit.

15. The apparatus according to claim 11, wherein the object is to be in contact with the plurality of vibrators.

16. The apparatus according to claim 11,
wherein the plurality of vibrators each comprise an elastic member having a plate-like shape and protrusion protruding from a top surface of the elastic member.

17. The apparatus according to claim 11,
wherein the plurality of vibrators are arranged to be in contact with the object,
wherein the relative position of the plurality of vibrators and the part of an object changes in a longitudinal direction of the plurality of vibrators.

18. The apparatus according to claim 11,
wherein the relative position of the plurality of vibrators and the part of an object changes linearly.

19. The apparatus according to claim 11,
wherein the object has a ring-like shape, and
wherein the plurality of vibrators are arranged in a ring so that the plurality of vibrators are to be in contact with the object.

* * * * *